United States Patent [19]

Blum

[11] 4,342,722

[45] Aug. 3, 1982

[54] CONTROL ROD FOR A NUCLEAR REACTOR

[75] Inventor: Jacques Blum, Levallois, France

[73] Assignee: Uranium Pechiney Ugine Kuhlmann, Paris, France

[21] Appl. No.: 200,146

[22] Filed: Oct. 24, 1980

[30] Foreign Application Priority Data

Nov. 19, 1979 [FR] France .................................. 79 29004

[51] Int. Cl.³ .............................................. G21C 7/04
[52] U.S. Cl. ...................................... 376/327; 376/447
[58] Field of Search ....................... 176/86 R, 36 R, 78

[56] References Cited

U.S. PATENT DOCUMENTS

| | | | |
|---|---|---|---|
| 3,175,955 | 3/1965 | Cheverton | 176/86 R |
| 3,255,086 | 6/1966 | Hitchcock | 176/86 R |
| 3,264,192 | 8/1966 | Wimune | 176/86 R |
| 3,267,002 | 8/1966 | Fromm, Jr. et al. | 176/86 R |
| 3,510,398 | 5/1970 | Wood | 176/86 R |
| 3,773,617 | 11/1973 | Marmonier et al. | 176/86 R |
| 4,169,760 | 10/1979 | Bevilacqua | 176/86 R |

FOREIGN PATENT DOCUMENTS

| | | | |
|---|---|---|---|
| 2041723 | 2/1971 | France | 176/86 R |
| 2017189 | 2/1977 | Japan | 176/86 R |
| 2067491 | 6/1977 | Japan | 176/86 R |

*Primary Examiner*—Harvey E. Behrend
*Attorney, Agent, or Firm*—Dennison, Meserole, Pollack & Scheiner

[57] ABSTRACT

A control rod having a center of thermal neutron absorbing material is provided specifically for use within the core of a nuclear reactor, extending through the central zone of maximum flux density. The center is formed of a plurality of portions, normally three, arranged end to end and defining joins therebetween. A central one of said portions extends continuously through the zone of maximum flux density with the joins located outward of this zone.

2 Claims, 4 Drawing Figures

CONTROL ROD FOR A NUCLEAR REACTOR

The invention relates to the control rods, also known as poison rods, used in water-cooled reactors for absorbing the excess reactivity from the fuel charge. These rods are arranged in a fixed position at predetermined points in a reactor core and extend through the central zone thereof where the neutron flux density is at a maximum. This absorption is effected by means of a material contained in these rods having a large thermal neutrons absorption cross-section.

One of the most common types of control rods is constituted by a can made of a zirconium-based alloy in which there is housed a solid or hollow center made of a material having a large thermal neutron absorption cross-section. The length of these rods is currently of the order of 4 to 5 m in the case of high power reactors. Boron glass tubes have thus been used for producing such centers. As it is very difficult to produce glass tubes of such a length in a single part, two approximately equal portions of tube, arranged end to end, have been used. The control rods obtained in this way have serious disadvantages. In fact, in certain cases, it has been observed that after positioning the two portions of boron glass tube inside the can, a narrow gap remains in the zone where these two portions are joined. After positioning the control rod in the reactor core in operation, a peak of neutron flux is thus observed in the region of this join. The join is located precisely in a zone of the core where the neutron flux has normally already attained its maximum density. There is therefore a risk of local over-heating of the fuel elements here, which can create very serious difficulties. The same risk would be run if shafts or shaped sections made of boron glass or of other thermal neutron absorbing materials and comprising a join in the zone of maximum neutron flux were used instead of tubes made of boron glass.

The new control rods forming the subject of the invention avoid discontinuity in the absorption of neutron flux in the entire zone where this flux attains its maximum value without, however, necessitating much longer portions of shafts, shaped sections or tubes made of boron glass or of other thermal neutron absorbing materials.

These rods comprise a center made of boron glass or of other thermal neutron absorbing materials in the form of a tube, a shaft or a shaped section constituted of several portions end to end, which does not have discontinuity in the entire reactor core zone where the neutron flux attains its maximum value or a value close to it.

The following non-limiting example and figures permit better understanding of the characteristics of an embodiment of the rods, according to the invention.

Figures 1, 2:
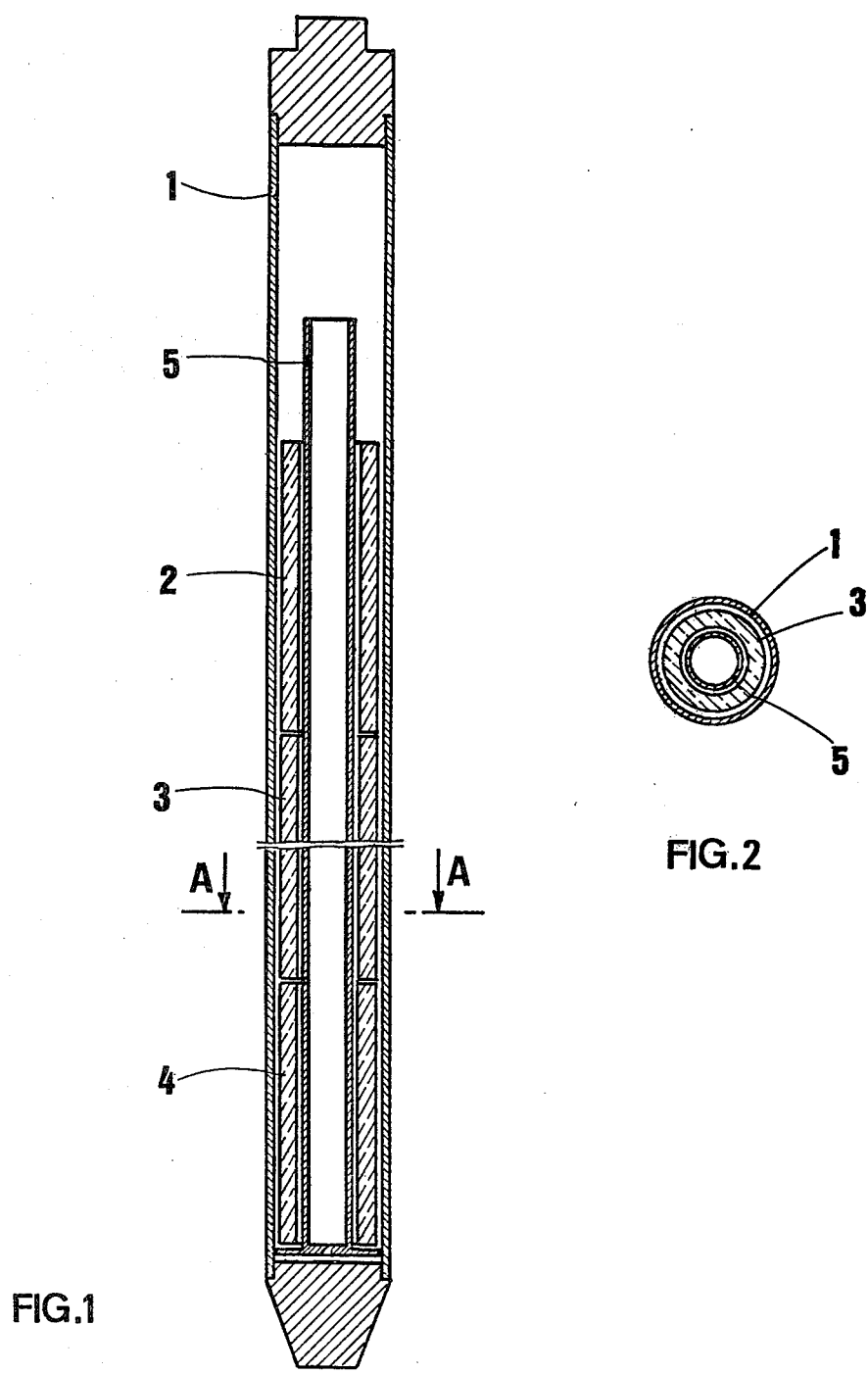
FIG. 1 is a schematic view in a longitudinal section of a control rod according to the invention.
FIG. 2 is a cross-sectional view along line A in FIG. 1.

FIG. 1 shows a control rod according to the invention which comprises a can 1 of zircaloy 4 (zirconium-based alloy containing 1.5% of tin and small quantities of Fe and Cr), approximately 4.4 m long, inside which there is housed a boron glass tube in three portions 2, 3, and 4 arranged end to end. The total length of this tube is 4.5 m.

In the embodiment described herein, a tubular spacer 5 of zirconium alloy is arranged inside the boron glass tube. The section in FIG. 2 shows the concentric arrangement of the spacer 5, the portion 3 of the boron glass tube and, finally, the can 1. In the case of the control rod illustrated, the can has a diameter of 9.7/8.7 mm, the boron glass tube a diameter of 8.5/4.8 mm and the spacer a diameter of 4.7/4.4 mm. The portion 3 of boron glass tube placed in the median zone of the control rod which is shown in section in FIG. 2 is, in fact, approximately half the length, that is to say 2.25 m of the total length of 4.5 m, of the three portions of this tube placed end to end. The length of each of the portions 2 and 4 is approximately equal to a quarter of the total length. In this way, the portion 3 extends along the entire high flux zone in the reactor core, and the joins between the ends of this portion and those of the adjacent portions 2 and 4 are located in zones where the neutron flux is less intense.

Figure 3:
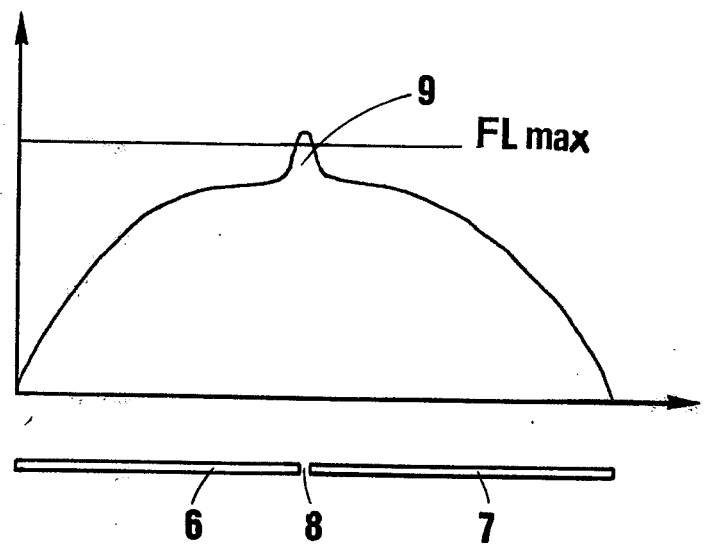
FIG. 3 shows schematically the variation in neutron flux along a control rod comprising a boron glass tube in two portions.

FIG. 3 shows what can happen if the boron glass tube comprises two equal portions with a join in the zone of maximum flux. In the graph, the abscissa represents the length of the control rod and the ordinate the neutron flux. The rod is represented schematically below the axis of the abscissae. The curve shows the variation in neutron flux along this rod. It can be seen that, if there is a gap 8 in the region of the join between the two portions 6 and 7 of the rod, the curve has a peak 9 of neutron flux. If this flux exceeds the acceptable nominal value, FL max, breakdowns may occur in the region of the overheated fuel elements.

Figure 4:
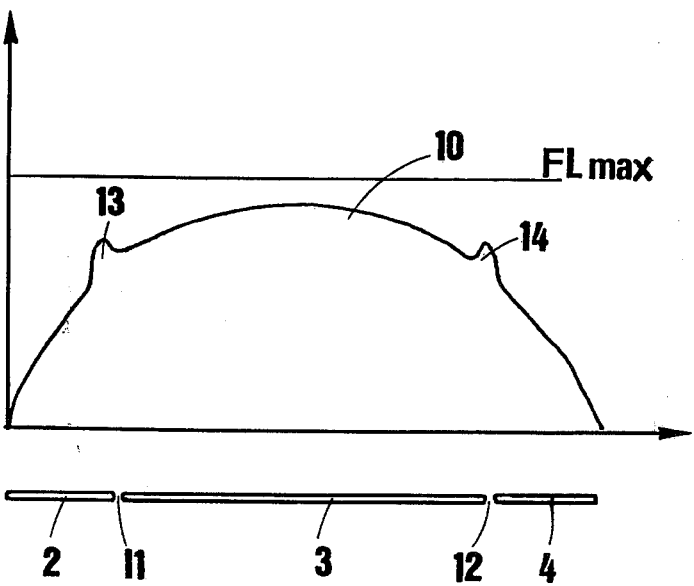
FIG. 4 shows in the same manner the variation in neutron flux along a control rod according to the invention.

On the other hand, in the case of the boron glass tube in three portions shown in FIG. 1, breakdowns are virtually impossible, as shown in FIG. 4. It is seen that, in this case, the median part of the control rod constituted by the portion 3 occupies the entire zone of intense neutron flux, as shown by the curve 10. If there are small gaps 11 and 12 in the region of the joins between the portion 3 and the end portions 2 and 4 of the boron glass tube, it is quite likely that the corresponding peaks of neutron flux 13 and 14 will not attain the maximum of the curve 10 and consequently, will remain well below the acceptable maximum value.

The new control rod which has been developed accordingly thus represents a very significant advance over the formerly proposed control rods. It is seen that the essential feature of this new control rod is that the boron glass center which it contains, and which is a tube in this Example, does not have discontinuity in the entire reactor core zone where the neutron flux attains its maximum value or a value close to it.

The boron glass center contained inside the control rod according to the invention should preferably be free from discontinuity in the entire zone where the flux attains a value higher than approximately 90% of the maximum value. This center can be broken into several portions outside this zone without major disadvantages. This center, which is produced in the form of a boron glass tube from at least 3 portions end to end in this Example, can also be produced according to the invention in the form of a shaft or of a shaped section in several portions which are free from discontinuity in the entire reactor core zone where the neutron flux attains its maximum value or a value close to it.

Glasses containing other thermal neutron absorbing elements, such as rare earths, can be used instead of a boron glass. The glasses can also be replaced by other compounds having a large absorption cross-section in the form of tubes, shafts or shaped sections obtained, for example, by sintering.

I claim:

1. In the core of a nuclear reactor having a central zone of maximum flux density and a control rod the improvement comprising said control rod having a length equal to said reactor core and being fixedly positioned within the reactor core such that the center of said control rod is central of and extends through said zone of maximum flux density, said control rod comprising a core having a plurality of at least three elongated sections made of boron glass positioned end to end to define non-overlapping joins therebetween, and at least one of said elongated sections is more than one-half the length of said control rod and is located centrally of said zone of maximum flux density of said core, and said joins being located outward of said zone of maximum flux density.

2. The control rod of claim 1 wherein at least one of said sections extends continuously through the zone of maximum flux density.

* * * * *